United States Patent
Martin, Jr. et al.

(10) Patent No.: US 6,509,913 B2
(45) Date of Patent: *Jan. 21, 2003

(54) CONFIGURABLE MAN-MACHINE INTERFACE

(75) Inventors: Bruce K. Martin, Jr., Palo Alto, CA (US); Bruce V. Schwartz, San Mateo, CA (US); Steve S. Boyle, Fremont, CA (US)

(73) Assignee: Openwave Systems Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,665

(22) Filed: Apr. 30, 1998

(65) Prior Publication Data

US 2002/0122061 A1 Sep. 5, 2002

(51) Int. Cl.⁷ .................................................. G06F 3/00
(52) U.S. Cl. ........................ 345/762; 455/566; 345/733
(58) Field of Search ................................. 345/329, 334, 345/335, 339, 349, 346, 357, 968, 733, 765, 762, 764, 804, 854; 707/513, 531, 512; 455/418, 419, 420, 566

(56) References Cited

U.S. PATENT DOCUMENTS

| | | | |
|---|---|---|---|
| 4,870,561 A | 9/1989 | Love et al. | |
| 5,115,501 A | 5/1992 | Kerr | |
| 5,157,384 A | 10/1992 | Greanias et al. | |
| 5,230,063 A | 7/1993 | Hoeber et al. | |
| 5,327,529 A | 7/1994 | Fults et al. | |
| 5,345,550 A | 9/1994 | Bloomfield | |
| 5,425,077 A | 6/1995 | Tsoi | |
| 5,488,650 A | 1/1996 | Greco et al. | |
| 5,572,643 A | * 11/1996 | Judson | 707/513 |
| 5,727,159 A | 3/1998 | Kikinis | |
| 5,796,394 A | * 8/1998 | Wilks et al. | 345/329 |
| 5,797,098 A | 8/1998 | Schroeder et al. | |
| 5,802,530 A | * 9/1998 | Van Hoff | 345/335 |
| 5,847,708 A | * 12/1998 | Wolff | 345/349 |
| 5,895,471 A | 4/1999 | King | |
| 6,173,316 B1 | * 1/2001 | De Boor | 709/218 |
| 6,181,935 B1 | * 1/2001 | Gossman et al. | 455/433 |

FOREIGN PATENT DOCUMENTS

| | | | |
|---|---|---|---|
| EP | 0809 385 A1 | 11/1997 | H04M/1/00 |
| EP | 0 813 159 | 12/1997 | |

OTHER PUBLICATIONS

Hudak–David, "A Beginner's Guide to HTML," National Center for Supercomputing Applications, Jan. 1997.

(List continued on next page.)

Primary Examiner—Cao H. Nguyen
(74) Attorney, Agent, or Firm—Beyer Weaver & Thomas, LLP

(57) ABSTRACT

Improved techniques for configuring user interfaces (e.g., man-machine interfaces) for wireless devices are disclosed. The configuring of user interfaces is able to be controlled by a network operator such that replacement, alteration or customization of the user interfaces by network operators is possible. Besides the ability to partially or completely change the user interface, such configuring or customization enables network operators to provide options, logos, advertising, etc. in a controllable way.

49 Claims, 6 Drawing Sheets

OTHER PUBLICATIONS

Raggett, "A review of the HTML+document format," Computer Networks and ISDN Systems 27 (1994) 135–145.

Powell, "Spinning the World Wide Web–An HTML Primer," Database, Feb. 1995, pp. 54–59.

McArthur, "World Wide Web & HTML," Dr. Dobbs Journal, Dec. 1, 1994, pp. 18–20, 22, 24.

Hahn, M, "Uniform Resource Locators," EDPACS, US, Auerbach Publishers, New York, New York vol. 23, No. 6, Dec. 1, 1995, pp. 8–13.

Kamada, "Compact HTML for Small Information Appliances," W3C Note, Feb. 9, 1998.

Meyer et al., "The On–The–Move Concept for Mobile Middleware," Proceedings on XVI ISS. World Telecommunications Congress (International Switching Symposium), CA, Toronto, Pinnacle Group, Sep. 21, 1997, pp. 373–378.

Udell, Jon, "Bridging Troubled Waters: *Cross–platform tools can save time and money—and perhaps your sanity"*, BYTE, Apr. 1990, pp. 225–230.

Schultz, Peter, "Libraries Boost Cross–Platform Efforts: *Three Tools Allow Developers To Maintain One Set of Source Code for DOS, Windows Programs"*, PC Week Reviews, Sep. 2, 1991, pp. 75–83.

Raney, Scott, "Pick a GUI, Any GUI", *UNIXWorld*, May 1991, pp. 103–107.

Singh et al., "Druid: A System for Demonstational Rapid User Interface Development", Proceedings of the ACM SIGGRAPH Symposium on User Interface Software and Technology, Snowbird, Utah, Oct. 1990, pp. 167–177.

Kim et al., "DON: User Interface Presentation Design Assistant", Proceedings of the ACM SIGGRAPH Symposium on User Interface Software and Technology, Snowbird, Utah, Oct. 1990, pp. 10–18.

Crawford and Pettus, "HIL–An Interface Design Language", 1988 IEEE SOUTHEASTCON, Knoxville TN, Apr. 1988, pp. 638–641.

Densmore and Rosenthal, "A User–Interface Toolkit in Object–Oriented PostScript", North Holland Computer Graphics Forum 6 (1987), pp. 171–179.

Beshers and Feiner "Scope: Automated Generation of Graphical Interfaces", Proceedings of the ACM SIGGRAPH Symposium on User Interface Software and Technology, Williamsburg, VA, Nov. 1989, pp. 76–85.

Gudes and Bracha, "GCI–A Tool for Developing Interactive CAD User Interfaces", Software–Practice and Experience, vol. 17(11), Nov. 1987, pp. 783–399.

Myers et al. "Creating Graphical Interactive Applications Objects by Demonstration", Proceedings of the ACM SIGGRAPH Symposium on User Interface Software and Technology, Williamsburg, VA, Nov. 1989, pp. 95–104.

"Independent User Interface for an Expert System", IBM Technical Disclosure Bulletin, Dec. 1985, pp. 3191–3193.

"Architecture for Separate User–Interface Software Development", IBM Technical Disclosure Bulletin, Nov. 1990, pp. 483–485.

"Dynamically Configurable User Interface for the Manipulation of Data Objects", IBM Technical Disclosure Bulletin, Mar. 1994, pp. 23–30.

"Wireless Application Protocol Architecture Specification" (WAP Architecture), Version 30, Apr. 1998.

"HDTP Draft Specification", Version 1.1, Unwired Planet, Inc. 1997.

"UP.Browser™ User Handbook", Unwired Planet, Inc. Nov., 1997.

HDML 2.0 Language Reference, Version 2.0, Unwired Planet, Inc. Software Developer Kit, Jul. 1997.

Berners–Lee, "Uniform Resource Locators", RFC1738, Network Working Group, Dec. 1994.

R. Fielding, "Relative Uniform Resource Locators", RFC 1808, Network Working Group, Jun. 1995.

Fielding et al., "Hypertext Transfer Protocol—HTTP/1.1", HTTP Working Group, Aug. 1996.

"Smart Messaging Specification", Nokia Mobile Phones Ltd., Sep. 15, 1997.

* cited by examiner

CONFIGURABLE MAN-MACHINE INTERFACE

CROSS-REFERENCE TO RELATED APPLICATION

This application is related to U.S. patent application Ser. No. 09/070,673, filed concurrently herewith, entitled "METHOD AND APPARATUS FOR FLEXIBLY LINKING USING ALIASES", which is hereby incorporated by reference for all purposes.

BACKGROUND OF THE INVENTION

1. Field of the Invention

The present invention relates to user interfaces and, more particularly, to user interfaces for mobile devices.

2. Description of the Related Art

Wireless terminals or devices, such as cellular telephones, pagers and Personal Digital Assistants (PDAs), contain interfaces between the user and the machine. Such interfaces are referred to as user interfaces or man-machine interfaces ("MMIs"). These interfaces determine how a user is able to interact with the terminal or device. Typically, the user interfaces include a display device (e.g., a LCD display) which displays information or choices for the user of the terminals or devices, and the user navigates through the information or choices with buttons.

FIG. 1 is an illustration of a conventional mobile telephone 100 having a fixed man-machine interface (MMI) 102. The fixed MMI includes a display portion 102 where a variety of user interface components that are useful in the operation of the mobile telephone 100 are displayed. Such user interface components can, for example, include the telephone number called 104, a mode indicator 106 (e.g., whether digital or analog), and various status bars 108. For example, such status bars can represent battery level, signal strength, or volume. As is also common, the cellular telephone 100 also includes navigation buttons 110 and 112 as well as an alphanumeric keypad 114. The navigation buttons 110 and 112 can also be considered part of the fixed MMI. The navigation buttons 110 and 112 allow a user to make selections from menus or lists. The alphanumeric keypad 114 allows a user to enter alphanumeric information with respect to the cellular telephone 100.

A major disadvantage of the fixed MMI available with the conventional mobile telephone 100 is that it is not able to be modified following manufacture of the mobile telephone. In other words the user interface or MMI of conventional wireless terminals or devices are set in the factory when the terminals or devices are manufactured and thus cannot be subsequently modified or supplemented. Also, different manufacturers typically have differences in their MMIs and given that they are fixed upon manufacture, significant compatibility problems arise and complicate the uniform delivery of information to a wireless terminal or device.

Some carrier networks that provide connection services to the wireless terminals or devices have the ability to customize the user interface by displaying the name or logo of the carrier network (or network operator). Further, some wireless devices have recently offered the limited ability to control sub-menu choices that are made available in menus provided in a user interface. See, e.g., Smart Messaging Specification, Revision 1.0.0, Nokia Mobile Phones Ltd., Sep. 15, 1997. While the limited ability to control sub-menu choices and to add one's name or logo are helpful, the degree of change to a user interface that these conventional approaches provide is too restrictive for many applications. Examples of applications not available with conventional approaches are the ability to insert advertising and other revenue generating information into a user interface and the ability to generally provide additional information or services in the user interface that would be useful to the user. In addition, the ability to control sub-menu choices or add one's name or logo does not allow the compatibility problems to be overcome, nor does it allow the user interface or MMI to be significantly modified or supplemented after being manufactured.

Thus, there is a need for improved techniques for altering man-machine interfaces for wireless devices after being manufactured.

SUMMARY OF THE INVENTION

Broadly speaking, the invention relates to improved techniques for configuring user interfaces (e.g., man-machine interfaces) for wireless devices. The configuring a user interface is able to be controlled by a network operator such that replacement, alteration or customization of the user interfaces by the network operator is possible. Besides the ability to partially or completely change the user interface, such configuring or customization enables network operators to provide options, logos, advertising, etc. in a controllable way.

The invention can be implemented in numerous ways, including as a method, an apparatus, and a computer system. Several embodiments of the invention are discussed below.

As a method for configuring a user interface on a display screen associated with a remote computing device operating a browser program and capable of being coupled to a network server, an embodiment of the invention includes the operations of: receiving screen configuration information that contains a plurality of user interface components that together form a screen to be displayed on the display screen, each of the user interface components corresponding to a particular aspect of the user interface; locating particular content information for the user interface components based on the screen configuration information; retrieving the particular content information for the user interface components; and displaying the content information for the identified user interface component on the display screen.

As a mobile device that couples to a network server, an embodiment of the invention includes: a display screen; and a computer readable media storing computer program instructions for operating a browser program and for storing computer program instructions for configuring a user interface on the display screen. The computer program instructions for configuring the user interface on the display screen include: program code for receiving screen configuration information that contains a plurality of user interface components that together form a screen to be displayed on the display screen, each of the user interface components corresponding to a particular aspect of the user interface; program code for locating particular content information for the user interface components based on the screen configuration information; program code for retrieving the particular content information for the user interface components; and program code for displaying the content information for the identified user interface component on the display screen.

As a computer readable medium containing program code for configuring a user interface on a display screen associated with a remote computing device operating a browser program and capable of being coupled to a network server, an embodiment of the invention includes: first program code for receiving screen configuration information that contains a plurality of user interface components that together form a screen to be displayed on the display screen, each of the user interface components corresponding to a particular aspect of the user interface; second program code for locating particular content information for the user interface components based on the screen configuration information; third program code for locating particular content information for the user interface components based on the screen configuration information; fourth program code for retrieving the particular content information for the user interface components; and fifth program code for displaying the content information for the identified user interface component on the display screen.

As an apparatus for centrally managing user interfaces for different mobile devices having display screens, an embodiment of the invention includes: a memory for storing user interface information for mobile devices; and a user interface controller operatively connected to the memory. The user interface controller operates to identify a particular one of the mobile devices, determine appropriate screen setup information for the particular one of the mobile devices, and forward the determined appropriate screen setup information to the particular one of the mobile devices such that the particular one of the mobile devices can setup a screen displayed on its display screen in accordance with the appropriate screen setup information.

The advantages of the invention are numerous. One advantage of the invention is that a user interface for a remote wireless computing device is able to be modified, configured or designed after the remote wireless computing device is manufactured. Another advantage of the invention is that complete screen control is available. Still another advantage of the invention is that a remote server machine or an operator thereof can control the user interface utilized on a remote wireless computing device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Broadly speaking, the invention relates to improved techniques for configuring user interfaces (e.g., man-machine interfaces) for wireless devices. The configuring of user interfaces is able to be controlled by a network operator such that replacement, alteration or customization of the user interfaces by network operators is possible. Besides the ability to partially or completely change the user interface, such configuring or customization enables network operators to provide options, logos, advertising, etc. in a controllable way.

Embodiments of the invention are discussed below with reference to FIGS. 2A–4. However, those skilled in the art will readily appreciate that the detailed description given herein with respect to these figures is for explanatory purposes as the invention extends beyond these limited embodiments.

Figure 1:
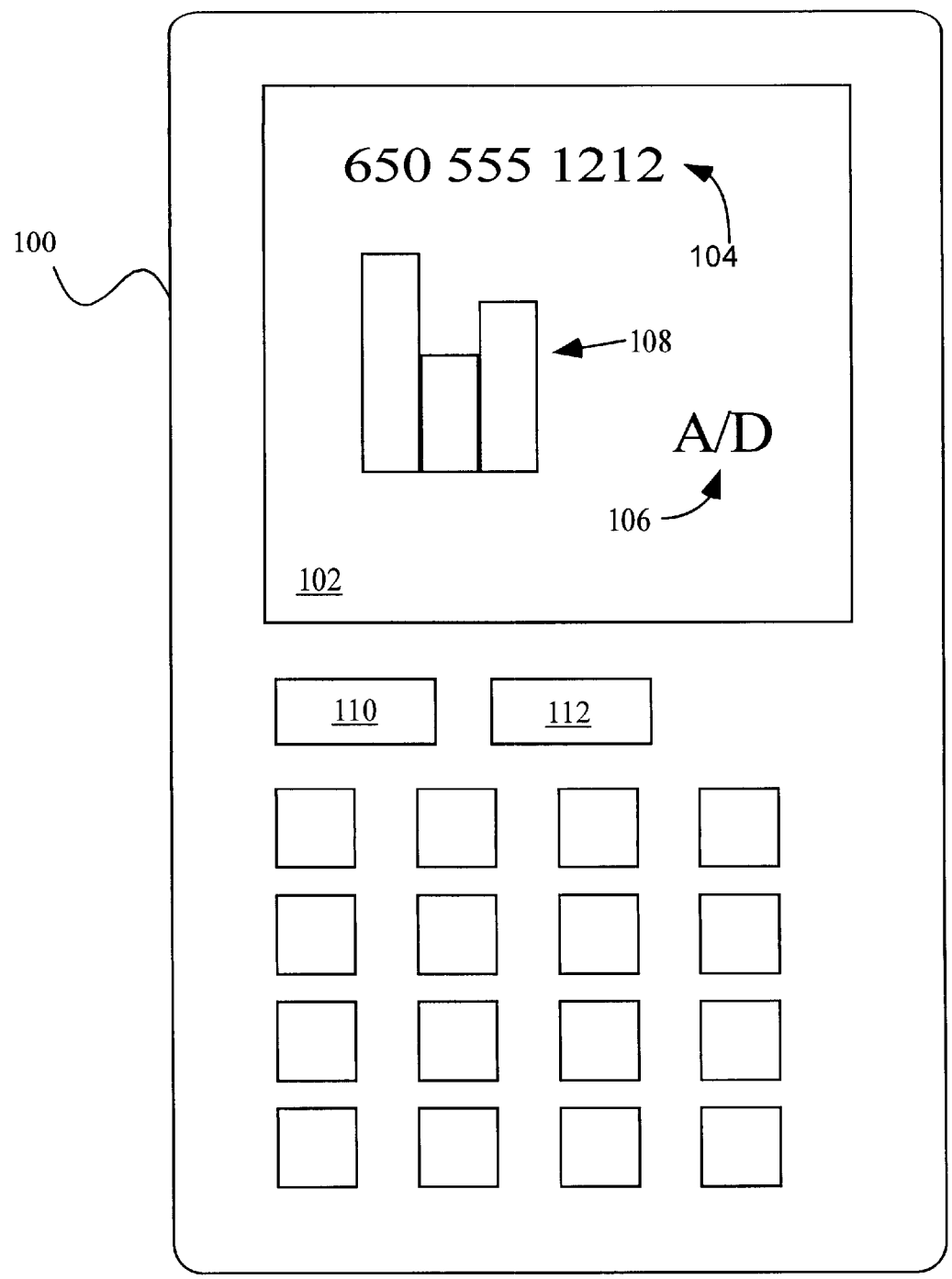
FIG. 1 is an illustration of a conventional cellular telephone having a fixed man-machine interface (MMI)
Figure 2A:
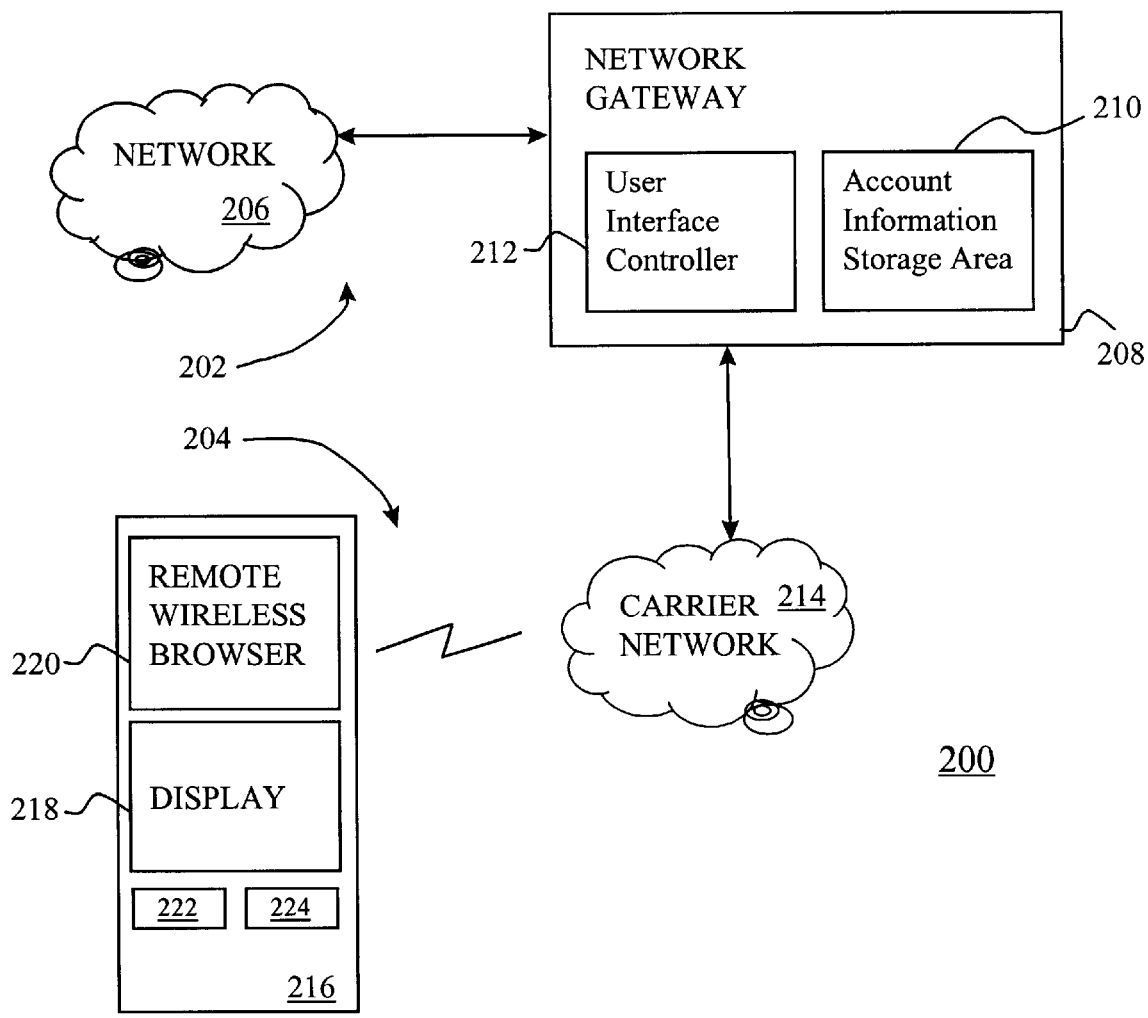
FIG. 2A is a block diagram of a communication system according to an embodiment of the invention.

FIG. 2A is a block diagram of a communication system 200 according to an embodiment of the invention. The communication system 200 includes a wired section 202 and a wireless section 204. The wired section 202 includes a network 206 and a network gateway 208. In one embodiment, the network 206 is the Internet, which represents a large number of interconnected computers. In another embodiment, the network 206 is an intranet or private network of computers.

The network gateway 208 operates to provide a gateway from the wired section 202 and the wireless section 204. The network gateway 208 will normally perform some protocol translation and other account management and verification operations. The network gateway 208 includes an account information storage area 210 that stores account, configuration and other information. The network gateway 208 also includes a user interface controller 212 for administrating user interfaces associated with remote wireless computing devices. The wireless section 204 includes a carrier network 214 and at least one remote wireless computing device 216. The remote computing device 216 can, for example, be a mobile phone, a Personal Digital Assistant (PDA), or a portable general purpose computer.

The remote wireless computing device 216 includes a display 218 for displaying screens or pages of information, a remote wireless browser 220, and navigation buttons 222 and 224. The remote wireless browser 220 is usually an application program that executes on the remote computing device 216. The remote wireless browser 220 provides the screens or pages of information to be displayed on the display 218. The navigation buttons 222 and 224 allow a user to navigate through or make selections from menus or lists being displayed on the display 218 by the remote wireless browser 220. The remote wireless computing device 216 can also include an alphanumeric keypad (not shown) that allows a user to enter alphanumeric information with respect to the mobile telephone 216, though such is not necessary as alphanumeric information can also be entered using a dial screen displayed on the display 218 with selections being made using the navigation buttons 222 and 224. By interacting with the remote wireless browser 220, a user is able to access information located on the network 206. Additional details on accessing the network from a remote wireless device are contained in the above-mentioned U.S. patent application Ser. No. 09/070,673.

Typically, the wireless section 204 will include a plurality of remote wireless browsers 220, each of which executes on a different remote computing device. The configuration and other information stored in the account information storage area 210 can store service limitations, security limitations, preference information, screen configuration information, and the like for each of the remote wireless browsers 220.

The account information storage area 210 can also store data or pages of data that are of interest to the remote wireless browsers 220. The stored data or pages can operate as a cache of information previously requested from the network 206 or can operate as an information server within the network gateway 208. For example, as an information server, the storage pages can represent pages to be displayed by the remote wireless browsers.

The invention makes use of screen configuration information. The screen configuration information can be determined and stored by the user interface controller 212 of the network gateway 208. In the described embodiment, the user interface controller 212 stores the screen configuration information in the account information storage area 210 such that it can be associated with individual or groups of subscribers. However, in general, the screen configuration information can be stored elsewhere on the network gateway 208 or in any remote location that is coupled to the network gateway 208. As an example, the configuration information can be stored in a database used by the network gateway 208. In a case where such a database is used, the database can store a large number of different screen configurations or options, and the user interface controller 212 can retrieve the desired screen configuration from the database and forward it to the remote wireless computing device via the carrier network 214.

The screen configuration information is provided to the remote wireless browser 220 of the remote wireless computing device 216 to control the configuration of the screen being displayed on the display 218 of the remote wireless computing device 216. In one embodiment, the screen configuration information provided to the remote wireless browser 220 is a configuration file that directs the remote wireless browser 220 in arranging the screen displayed on the display 218. The configuration file is downloaded by the user interface controller 212 within the network gateway 208 to the remote computing device 216. Then, the screen displayed is arranged or configured by the remote wireless browser 220 in accordance with the configuration file. The screen displayed is thus the desired MMI for the remote computing device 216.

Generally, according to the invention, the user interface controller 212 is able to send to the remote computing device 216 the screen configuration information. In one embodiment, the screen configuration information is maintained in the account information storage area 210 of the network gateway 208. In any case, regardless of how the screen configuration information is maintained by the network gateway 208, the screen configuration information is forwarded by the network gateway 208, or other central location, to the remote wireless computing device 216. Upon receiving the configuration information at the remote wireless computing device 216, the remote wireless browser 220 can create the screens to be displayed on the display 218 in accordance with the screen configuration information. For example, in one embodiment, the screen configuration information provided to the remote computing device 216 is a markup language or script language that is executed by the remote wireless browser 220 to create the screen to be displayed on the display 218.

According to the invention, the screen displayed (i.e., user interface or the MMI) can be specially formatted or customized for use with a remote wireless browser (and its associated remote computing device) or a particular user of a remote wireless browser. Further, the screen displayed is able to be controlled by a remote server machine (e.g., the network gateway 208 or the user interface controller 212 thereof) or a network operator of such machine. As a result, after the remote computing device has been fabricated, the screen displayed is controlled by or from a remote server machine.

Figure 2B:
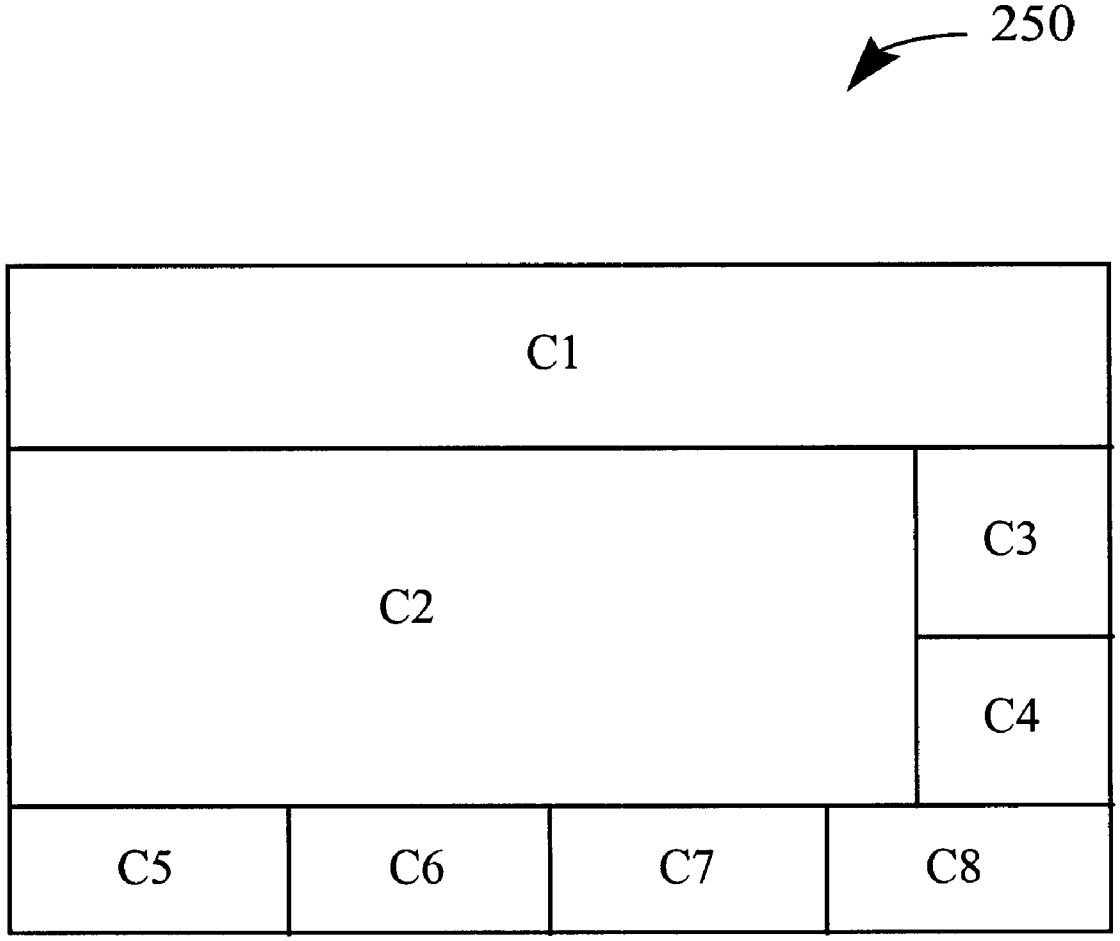
FIG. 2B is a diagram of a representative configured screen that is displayed on the display according to an embodiment of the invention.

FIG. 2B is a diagram of a representative configured screen 250 that is displayed on the display 218 according to an embodiment of the invention. As will become apparent below, the configured screen is suitable for use when the remote computing device is a mobile phone. The representative configured screen 250 includes a plurality of components C1–C8 that together form the configured screen 250. Each of these components C1–C8 are determined and arranged by the screen configuration information, and the contents of the screens can also be controlled by the screen configuration information. For example, with respect to the representative configured screen 250, the components C1–C8 can be assigned locations on the screen as well as contents to be displayed within each of the components. In one embodiment, the screen configuration information is provided by a markup or script language or other hypermedia that provides a description of the desired screen (MMI). The contents for the components can, for example, be a menu list, a button, or an image (e.g., advertisement, logo, etc.). For example, the screen configuration information could (in addition to arranging the components as shown in FIG. 2B) assign the contents for each of the components as indicated in Table 1 below.

TABLE 1

| MMI Component | Content |
| --- | --- |
| C1 | http://operator.com/ad-101 |
| C2 | internal:dialing-screen |
| C3 | http://operator.com/logo |
| C4 | http://operator.com/lookup |
| C5 | internal:newsmenu |
| C6 | internal:weathermenu |
| C7 | internal:clearbutton |
| C8 | internal:redialbutton |

In this example, the screen is configured into eight (8) components (MMI components). Each of the components is assigned different contents that is to be depicted on the screen in the corresponding location of the component on the screen. The contents for the components are, in this example, identified by a resource locator, such as hypermedia link name (e.g., a Universal Resource Locator (URL) or Universal Resource Identifier (URI)) or hypermedia function name. In this way, the remote wireless browser 220 can recognize the resource locator, particularly since remote wireless browsers often understand markup languages or other hypermedia such as Handheld Device Markup Language (HDML), Wireless Markup Language (WML), HTML, WMLScript, Java, etc.

According to the example corresponding to Table 1, the components are assigned the following content. The first component C1 is used to display a advertisement banner (ad-101) on an upper portion of the screen 250. The image file (http://operator.com/ad-101) associated with the advertisement that is displayed is provided by the user interface controller 212 from the network gateway 208. The third component C3 is used to display a logo on a right-side portion of the screen 250. The image file (http://operator.com/logo) associated with the logo that is displayed is provided by the user interface controller 212 from the network gateway 208. The fourth component C4 is used to display a lookup number menu on a right-side portion of the screen 250. The structure and/or contents of the lookup number menu is represented by a file (http://operator.com/lookup) provided by the user interface controller 212 from the network gateway 208. The lookup number menu adds the feature that the user of the remote wireless device can select the lookup number menu when seeking to lookup another phone number instead of incurring an added cost of calling a "411" service. The remaining components C2 and C5–C8 are other components of the screen 250 but rely on default menus, buttons or other screen features that are built-in the mobile phone. More particularly, component C2 is a dialing screen, component C5 is a news menu, component C6 is a weather menu, component C7 is a clear button, and C8 is a redial button. Hence, with these components (C2 and C5–C8), the screen 250 is using default selections and selections provided by the user interface controller 212. However, in general, all or none of the components of a screen are able to be controlled to use either default content or override content provided by the user interface controller 212.

Each of the components associated with a screen to be displayed can have an associated URL (or URI). Default MMI components are used, for example, a default URL (or URI) stored in local memory 224 in the remote computing device 216. In one embodiment of the invention, the default MMI components would have a URL (or URI) that begins with "internal", for example, to indicate the associated MMI component belongs to the set of default MMI components. Other MMI components can use external resources that are identified by URLs (or URIs) designating remote locations.

During operation, the remote wireless browser 220 couples to the carrier network 214 using wireless communications. Once the remote wireless browser 220 has established connection with the carrier network 214, the remote wireless browser 220, or a user thereof, can initiate a request for connection to the network 206. Connection to the network 206 is useful when the remote wireless browser 220 desires information residing on the network 206 or the network gateway 208. Here, with respect to screen displays, the remote wireless browser 220 could access the network 206 or the network gateway 208 to obtain the content information for the components of the configured screen. For example, with respect to the configured screen 250 and Table 1, the remote wireless browser 220 would access the network 206 (or the network gateway 208) to obtain the content assigned to the components C1, C3 and C4. The access can be performed during initialization or at any time during a connection session between the remote wireless computing device 216 and the carrier network 214.

More particularly, the content request can operate as follows. The remote wireless browser 220 forwards a content request to the carrier network 214 using wireless communications. Then, the carrier network 214 forwards the content request to the network gateway 208 typically using wired communications.

The network gateway 208, which serves as a primary transition point between the wireless communication of the wireless section 204 and the wired communication of the wired section 204, receives the incoming content request from the carrier network 214 and performs protocol conversion as necessary. The network gateway 208 can then forward the content request to the user interface controller 212 which can either handle the request locally or forwards the request to the network gateway 208. In either case, the request is directed to a particular server computer. The particular server computer is the server computer within the network 206 or the network gateway 208 that stores the resource being requested by the content request. In one embodiment, the particular server computer is a HTTP server. Normally, the request contains a URL (or URI) that specifically identifies the resource and its location within the network 206 or the network gateway 208. The requested resource, if available, is then obtained from the particular server computer and provided to the network gateway 208. Again, the network gateway 208 performs protocol conversion as necessary and then forwards the requested resource to the carrier network 214. The carrier network 214 then in turn transmits the requested resource to the remote wireless browser 220 that had requested the resource using wireless communications. The content associated with the requested resource is then stored (i.e., cached) locally in the remote wireless computing device 216, and used by the remote wireless browser 220 to display the particular MMI components of the configured screen (or desired MMI). This same approach is used for obtaining the content for other components of the configured screen which are not locally available (e.g., non-defaults).

This configuration and other information stored in the account information storage area 210 can provide service limitations, security limitations, preference information, screen configuration information, and the like for the remote wireless browsers 220 included in the remote computing devices 216 within the communication system 200. As noted above, the account information storage area 210 can also store data or pages of data in the form of hypermedia files that are of interest to the user of the remote computing device 216. Still further, the account information storage area 210 can store screen data in the form of configuration files used to customize the MMI displayed on the display 218.

A configuration file can include screen configuration information that is used to update an alias table. The alias table can contain a single entry for each MMI component. Each entry in then alias table the indicates the appropriate URL (or URI) for obtaining the content of the component. In one embodiment of the invention, the alias table is stored in the local memory 224 of the remote wireless computing device 216 which is connected to and communicates with the remote wireless browser 220. Table 2 below illustrates a representative alias table. The alias table associates an alias component name with a URL for the content for the component.

TABLE 2

| MMI Component | Content URL |
| --- | --- |
| top-menu | http://operator.com/menu.wml |
| dialing-screen | internal:dialing-screen |
| . | . |
| . | . |
| . | . |

For example, as shown in Table 2, the alias "top-menu" is a MMI component that is used to look-up the actual URL "http://operator.com/menu.wml" in the alias table. Similarly, the alias "dialing-screen" corresponds or maps to the actual URL "internal:dialing screen" where "internal" is indicative of a default MMI component. Such an alias table as in Table 2 allows the MMI components for the remote wireless browser to be relocated or changed without having to reprogram or physically alter the remote wireless browser's operation. In this way, the MMI can be easily customized or provided with any user services as deemed suitable.

In one embodiment, the remote wireless device 220 is able to inform the network gateway 208 (or user interface controller 212) of its device identifier. The network gateway 208 is then able to determine particular characteristics of the particular mobile phone of interest. This would allow the configuration information to be customized to the manufacturer of the remote wireless device or user of the remote wireless device. Note that the account information stored in the account information storage area 210 can be indexed using the device identifier so as to determine the subscriber (user) of the remote wireless device and/or preferences of the user. Hence, the configuration information can be customized or determined based on any information in the account information storage area 210.

Figure 3A:
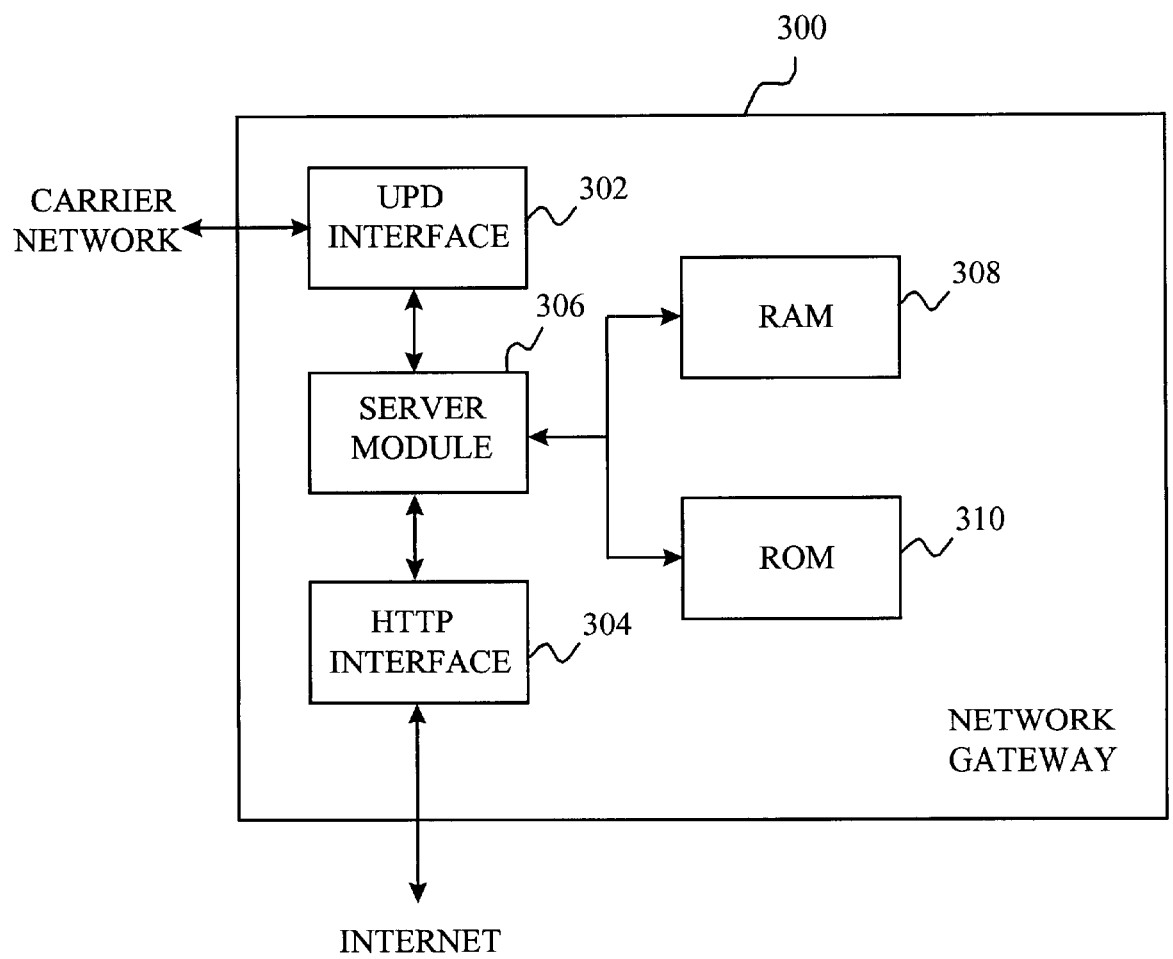
FIG. 3A is a block diagram of a network gateway according to an embodiment of the invention.

FIG. 3A is a block diagram of a network gateway 300 according to an embodiment of the invention. The network gateway 300 can, for example, represent the network gateway 208 illustrated in FIG. 2 which is typically a server computer. To avoid obscuring aspects of the present invention, well known methods, procedures, components, and circuitry in the network gateway 300 are not described in detail.

The network gateway 300 includes a User Datagram Protocol (UDP) interface 302 that couples to the carrier network 214, an HTTP interface 304 that couples to the network 206, and a server module 306 coupled between the UDP interface 302 and the HTTP interface 304. The server module 306 performs traditional server processing as well as protocol conversion processing. In particular, the protocol conversion processing includes protocol conversion between UDP and HTTP. The server module 306 also performs the processing for the user interface controller 212 which includes creation, modification and storage of configuration files and content resources associated therewith. Further, to assist the server module 306 in its processing, the proxy server 300 includes a random access memory (RAM) 308 and a read-only memory (ROM) 310. Among other things, the RAM 308 will store device identifiers, subscriber identifiers, configuration information, and alias conversion information. In one embodiment, such information is stored in the RAM 310 as a database. Also, the RAM 310 can represent the account information storage area 210 illustrated in FIG. 2.

Figure 3B:
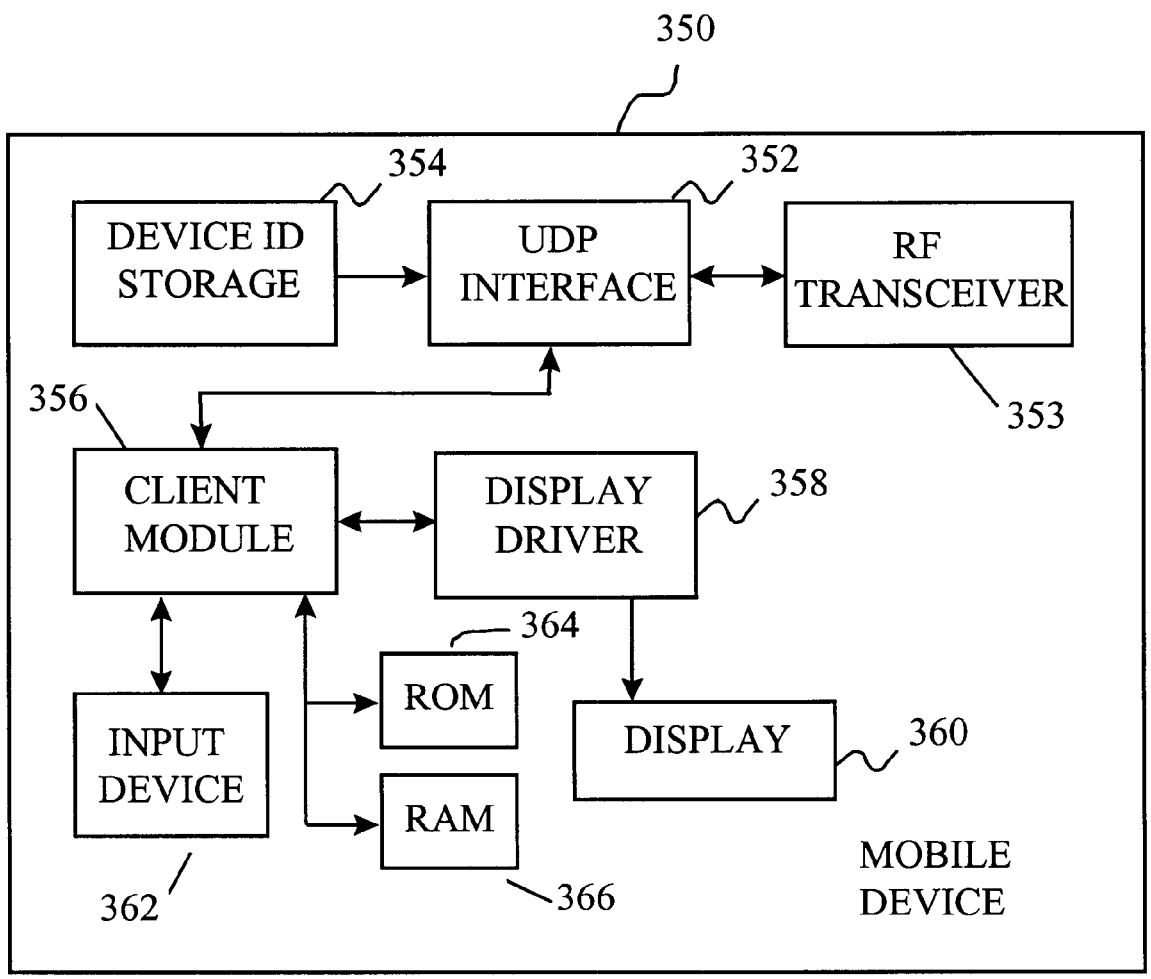
FIG. 3B is a block diagram of mobile device according to an embodiment of the invention.

FIG. 3B is a block diagram of mobile device 350 according to an embodiment of the invention. The mobile device 350 can, for example, correspond to the remote computing device 218 that operates the remote wireless browser 216 illustrated in FIG. 2.

The mobile device 350 includes a UDP interface 352 that couples to the carrier network 214 via a RF transceiver 353 to receive incoming and outgoing signals. A device identifier (ID) storage 354 supplies a device ID to the UDP interface 352. The device ID identifies a specific code that is associated with a particular mobile device 350. In addition, the mobile device 350 includes a client module 356 that performs many of the processing tasks performed by the mobile device 350 including establishing a communication session with the carrier network 214 and the network gateway 208, requesting and receiving data (e.g., pages) from the network 206, displaying information on a display of the remote computing device, and receiving user input. The client module 356 is coupled to the UDP interface 352 for the establishment of a communication session and the requesting and receiving of data. The client module 356 also couples to a display driver 358 that drives an addressable display 360 having selectable address locations capable of displaying selected MMI components. The client module 356 controls the display driver 358 to display information on the display 360 to the user by outputting to selected locations on the display 360 any desired MMI component. Additionally, the client module 356 is coupled to an input device 362, a ROM 364, and a RAM 366 capable of storing default MMI component URLs (or URIs), for example, usable to form a default MMI on the display 360. Preferably, among other things, the client module 356 operates a network browser, such as a Handheld Device Markup Language (HDML) web browser. The input device 362 allows a user of the mobile device 350 to input data and thus make selections in controlling and using the mobile device 350. The ROM 364 stores predetermined data and processing instructions for the client module 356. The RAM 366 is used to provide temporary data storage for incoming and outgoing data being received and transmitted as well as for storage of an alias table that facilitates the conversion of alias URLs to actual URLs.

Although embodiments of the network gateway 300 and the mobile device 350 described in FIGS. 3A and 3B use UDP and HTTP protocols, it should be recognized that other protocols and other protocol stacks can be provided and utilized. Additional details on the design and construction of the network gateway 300 and the mobile device 350 are contained in commonly assigned U.S. patent application Ser. No. 08/570,210, now U.S. Pat. No. 5,809,415 entitled "METHOD AND ARCHITECTURE FOR AN INTERACTIVE TWO-WAY DATA COMMUNICATION NETWORK" by Alain Rossmann which is hereby incorporated by reference in its entirety.

Although the embodiment of the invention illustrated in FIG. 2A illustrates the user interface controller 212 and its associated screen configuration information as being stored therein, it should be recognized that the user interface controller can be provided elsewhere. For example, the carrier network itself could provide the service to the remote computing devices.

When the remote wireless browser 220 in the remote computing device is activated, it typically requests a communication session with the network gateway 208 and then seeks to display its initial page of information that is displayed to the user. Hence, prior to obtaining and displaying the initial page, the remote computing device performs initialization processing in order to establish communications with the network gateway 208. As part of the initialization, the remote computing device can receive one or more configuration files for screens as well as content resources for such screens The initialization processing and page display processing associated with the invention are described below in FIG. 4.

Figure 4:
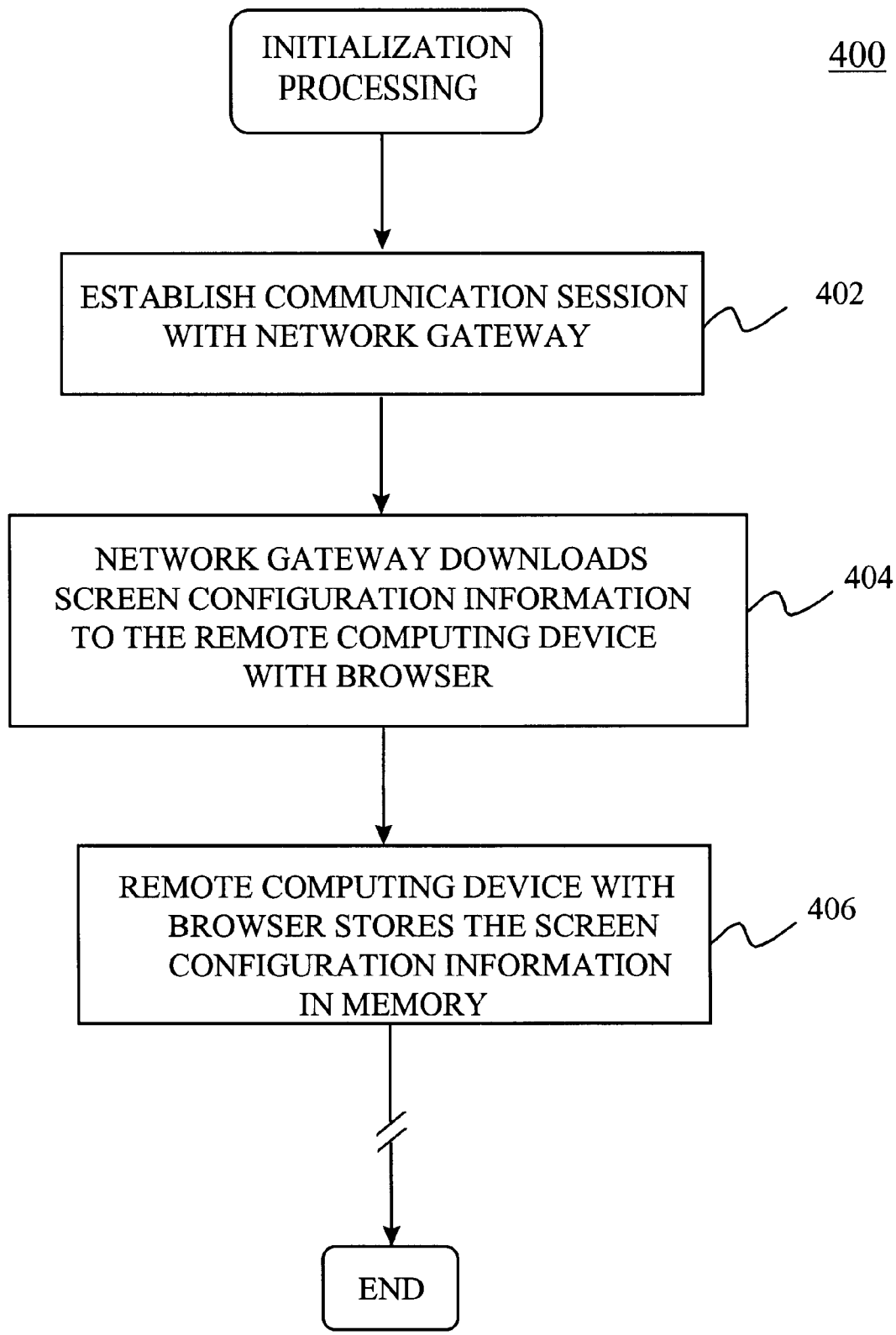
FIG. 4 is a flow diagram of MMI display processing according to an embodiment of the invention.

FIG. 4 is a flow diagram of MMI display processing according to an embodiment of the invention. The initialization processing 400 initially establishes 402 a communication session between the mobile device 350 (i.e., remote wireless browser 216) and the network gateway 206. The communication session can be established in a number of different ways. According to one implementation, with respect to FIGS. 2A and 3B, the remote wireless browser 220 executing on the mobile device 350 will communicate with the network gateway 208 via the carrier network 214. The mobile device 350 retrieves its device ID from the device ID storage 354 and forwards it to the network gateway 208. The network gateway 208 receives the device ID and the server module 306 searches the RAM 308 to determine whether the database stored therein recognizes the device ID. If the device ID is recognized, the communication session is permitted. Additionally, if desired, additional authorizations, passwords or other security checks can be performed before permitting the communication session.

Once the communication session has been established, the network gateway 208 determines if screen configuration information is to be downloaded to the remote computing device 216. If it is determined that screen configuration information is to be downloaded, the network gateway 208 (namely, the user interface controller 212) downloads the screen configuration information to the remote computing device. The remote computing device then stores the screen configuration information in memory. According to one implementation, with respect to FIGS. 3B, the configuration information can be stored in the RAM 366 of the mobile device 350. The configuration information can, for example, include a configuration file and alias information to be stored in an alias table for the screen components.

Following block 406, additional initialization processing can be performed between the remote computing device and the network gateway 208 depending upon the particular implementation and application. Such additional initialization processing is not associated with the present invention and not further discussed herein so as to not obscure the invention.

The advantages of the invention are numerous. One advantage of the invention is that a user interface for a remote wireless computing device is able to be modified, configured or designed after the remote wireless computing device is manufactured. Another advantage of the invention is that complete screen control is available. Still another advantage of the invention is that a remote server machine or an operator thereof can control the user interface utilized on a remote wireless computing device.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for configuring a user interface on a display screen associated with a remote computing device operating a browser program and capable of being coupled to a network server, said method comprising:

(a) receiving screen configuration information that contains a plurality of user interface components that together form a screen to be displayed on the display screen, each of the user interface components corresponding to a particular aspect of the user interface, the screen configuration information being received at least partially from the network server, and the screen configuration information further including resource locators that specify content to be displayed in the user interface components, the content being separate and apart from the screen configuration information;

(b) locating particular content information for the user interface components based on the screen configuration information;

(c) retrieving the particular content information for the user interface components; and (d) displaying the content information for the identified user interface component on the display screen.

2. A method as recited in claim 1, wherein the screen configuration information provides a screen layout description and controls placement of the user interface components.

3. A method as recited in claim 1, wherein the configuration information is provided by a markup language.

4. A method as recited in claim 3, wherein at least one of the resource locators is a default resource locator.

5. A method for configuring a user interface on a display screen associated with a remote computing device operating a browser program and capable of being coupled to a network server, said method comprising:

(a) receiving screen configuration information that contains a plurality of user interface components that together form a screen to be displayed on the display screen, each of the user interface components corresponding to a particular aspect of the user interface, the screen configuration information being received at least partially from the network server, and for each of the user interface components, the configuration information designates either a default resource locator or an override resource locator;

(b) locating particular content information for the user interface components based on the screen configuration information;

(c) retrieving the particular content information for the user interface components; and (d) displaying the content information for the identified user interface component on the display screen.

6. A method as recited in claim 5, wherein the override resource locators are locators of content on a remote server.

7. A method for configuring a user interface on a display screen associated with a remote computing device operating a browser program and capable of being coupled to a network server, said method comprising:

(a) receiving screen configuration information that contains a plurality of user interface components that together form a screen to be displayed on the display screen, each of the user interface components corresponding to a particular aspect of the user interface, the screen configuration information being received at least partially from the network server, the configuration information including resource locators for content to be displayed in the user interface components, and the resource locators being stored in an alias table in the remote computing device;

(b) locating particular content information for the user interface components based on the screen configuration information;

(c) retrieving the particular content information for the user interface components; and (d) displaying the content information for the identified user interface component on the display screen.

8. A method as recited in claim 7, wherein for each of the user interface components, the configuration information designates either a default resource locator or an override resource locator, and wherein the alias table stores URIs for at least the override resource locators.

9. A method as recited in claim 1, wherein the portable computing device is a mobile phone.

10. A method for configuring a user interface on a display screen associated with a remote computing device operating a browser program and capable of being coupled to a network server, said method comprising:

(a) receiving screen configuration information that contains a plurality of user interface components that together form a screen to be displayed on the display screen, each of the user interface components corresponding to a particular aspect of the user interface, the screen configuration information being provided by a remote server machine with which the remote computing device can couple with to retrieve the screen configuration information, and the screen configuration information further including resource locators that specify content to be displayed in the user interface components, the content being separate and apart from the screen configuration information;

(b) locating particular content information for the user interface components based on the screen configuration information;

(c) retrieving the particular content information for the user interface components; and (d) displaying the content information for the identified user interface component on the display screen.

11. A mobile device that couples to a network server, comprising:

a display screen; and a computer readable media storing computer program instructions for operating a browser program and for storing computer program instructions for configuring a user interface on said display screen, wherein the computer program instructions for configuring the user interface on said display screen include:

program code for receiving screen configuration information that contains a plurality of user interface components that together form a screen to be displayed on the display screen, each of the user interface components corresponding to a particular aspect of the user interface, the screen configuration information being received at least partially from the network server, and the screen configuration information further including resource locators that specify content to be displayed in the user interface components, the content being separate and apart from the screen configuration information;

program code for locating particular content information for the user interface components based on the screen configuration information;

program code for retrieving the particular content information for the user interface components; and program code for displaying the content information for the identified user interface component on said display screen.

12. A mobile device as recited in claim 11, wherein said mobile device is a mobile telephone and has said display screen integral therewith.

13. A mobile device as recited in claim 11, wherein said mobile device is a wireless pager and has said display screen integral therewith.

14. A mobile device as recited in claim 11, wherein said mobile device includes volatile memory storage, and wherein said program code for locating utilizes a look-up table stored in said volatile memory storage.

15. A mobile device as recited in claim 11, wherein said mobile device includes volatile memory storage, and wherein said program code for locating comprises:

program code for downloading the screen configuration information from the network server; and program code for storing the screen configuration information in said volatile memory storage.

16. A mobile device as recited in claim 15, wherein said program code for storing the screen configuration information in said volatile memory storage stores the screen configuration information in a table within said volatile memory storage, and wherein said program code for storing the screen configuration information in said volatile memory storage includes program code for indexing into the table using the user interface component to identify the resource location for the user interface component.

17. A computer readable medium containing program code for configuring a user interface on a display screen associated with a remote computing device operating a browser program and capable of being coupled to a network server, said computer readable medium comprising:

first program code for receiving screen configuration information that contains a plurality of user interface components that together form a screen to be displayed on the display screen, each of the user interface components corresponding to a particular aspect of the user interface, the screen configuration information being received at least partially from the network server, and the screen configuration information further including resource locators that specify content to be displayed in the user interface components, the content being separate and apart from the screen configuration information;

second program code for locating particular content information for the user interface components based on the screen configuration information;

third program code for locating particular content information for the user interface components based on the screen configuration information;

fourth program code for retrieving the particular content information for the user interface components; and fifth program code for displaying the content information for the identified user interface component on the display screen.

18. A computer readable medium as recited in claim 17, wherein the remote computing device is a mobile device having the display screen integrally formed therewith.

19. A server machine for centrally managing user interfaces for different mobile devices having display screens, said computer system comprising:

a memory for storing user interface information for mobile devices; and a user interface controller operatively connected to said memory, said user interface controller operates to identify a particular one of the mobile devices, determine appropriate screen setup information for the particular one of the mobile devices, and forward the determined appropriate screen setup information to the particular one of the mobile devices such that the particular one of the mobile devices can setup a screen displayed on its display screen in accordance with the appropriate screen setup information.

20. A server machine as recited in claim 19, wherein the particular one of the mobile devices is identified by a device identifier associated therewith, and the appropriate screen setup information for the particular one of the mobile devices is determined by the device identifier.

21. A server machine as recited in claim 20, wherein said server machine coupled between a carrier network for the mobile devices and a wired network.

22. A server machine as recited in claim 21, wherein the wired network is the Internet.

23. A server machine as recited in claim 19, wherein the particular one of the mobile devices is a mobile phone having a display screen integral therewith.

24. A server machine as recited in claim 19, wherein said user interface controller identifies the particular one of the mobile devices using a unique device identifier for the particular one of the mobile devices.

25. A server machine as recited in claim 24, wherein said user interface controller selects the appropriate screen setup information for the particular one of the mobile devices based on the device identifier for the particular one of the mobile devices.

26. A server machine as recited in claim 19, wherein said user interface controller determines the appropriate screen setup information for the particular one of the mobile devices based on preferences associated with the particular one of the mobile devices.

27. A method of modifying user-interface configuration content associated with a plurality of wireless communication devices serviced by a network gateway device, said method comprising:

providing user-interface configuration files at the network gateway device for one or more of the plurality of wireless communication devices serviced by the network gateway device, the user-interface configuration files including user-interface configuration content;

receiving a device identifier from one of the plurality of wireless communication devices serviced by the network gateway device; and forwarding the corresponding one of the user-interface configuration files from the network gateway device to the one of the wireless communication devices associated with the received device identifier over a wireless communications network using a wireless communications protocol.

28. A method as recited in claim 27, wherein one of the user-interface configuration files is provided for each of the wireless communication devices.

29. A method as recited in claim 27, wherein the user-interface configuration files are stored in account information storage areas at the network gateway device associated with the wireless communication devices.

30. A method as recited in claim 27, wherein the user-interface configuration files are markup language files.

31. A method as recited in claim 27, wherein the wireless communication protocol is selected from one of User Datagram Protocol (UDP) or HTTP.

32. A method as recited in claim 27, wherein the user-interface configuration content contains screen displayable components and uniform resource indicators (URIs).

33. A method as recited in claim 27, wherein the user-interface configuration content includes screen configuration and placement instructions.

34. A method as recited in claim 27, wherein the user-interface configuration content includes one or more resource locators for one or more screen displayable components for display on a display screen of one of the wireless communication devices.

35. A method as recited in claim 34, wherein the user-interface configuration content designates either a default resource locator or an override resource locator.

36. A method as recited in claim 35, wherein the override resource locators are associated with content updates stored on a remote server device, where the content is designated for one or more of the wireless communication devices serviced by the network gateway device.

37. A method as recited in claim 27, wherein the user-interface configuration content describes a plurality of user interface components to be displayed on the one of the wireless communication devices.

38. A method as recited in claim 37, wherein the user-interface configuration content includes a resource locator for each of the user interface components to be displayed.

39. A method as recited in claim 38, wherein the resource locators designated by the user interface configuration content and provided for the one of the wireless communication devices stored in an alias table on the one of the wireless communication devices.

40. A method as recited in claim 39, wherein the alias table stores URIs for the override resource locators.

41. A method as recited in claim 37, wherein for each of the user interface components, the user-interface configuration content designates either a default resource locator or an override resource locator.

42. A method as recited in claim 27, wherein a plurality of the wireless communication devices are mobile phones.

43. A method as recited in claim 42, wherein said method further comprises:

altering a user-interface for the one of the wireless communication devices based on the user-interface configuration content included within the corresponding one of the user-interface configuration files forwarded by the network gateway device.

44. A method as recited in claim 43, wherein the user-interface configuration content describes a plurality of user interface components to be displayed on the one of the wireless communication devices.

45. A method as recited in claim 44, wherein the user-interface configuration content includes a resource locator for each of the user interface components to be displayed.

46. A method as recited in claim 45, wherein the resource locators designated by the user interface configuration content and provided for the one of the wireless communication devices stored in an alias table on the one of the wireless communication devices.

47. A method as recited in claim 43, wherein the user-interface configuration content is contained within a markup language file.

48. A method as recited in claim 43, wherein the plurality of wireless communication devices are mobile phones.

49. A method of modifying user-interface configuration content associated with a plurality of wireless communication devices serviced by a network gateway device, said method comprising:

forwarding a device identifier for a wireless communication device to the network gateway device, the device identifier being used by the network gateway device to retrieve user-interface configuration content associated with the device identifier;

receiving user-interface configuration content from the network gateway device; and implementing the received user-interface configuration content on the wireless communication device.

* * * * *